US012688081B2

(12) United States Patent
Haile

(10) Patent No.: US 12,688,081 B2
(45) Date of Patent: *Jul. 21, 2026

(54) VISUAL ALERT GENERATION IN A DATA PIPELINE ENVIRONMENT

(71) Applicant: Data Culpa, Inc., Carlisle, MA (US)

(72) Inventor: J. Mitchell Haile, Carlisle, MA (US)

(73) Assignee: Data Culpa, Inc., Carlisle, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,035

(22) Filed: Dec. 20, 2023

(65) Prior Publication Data

US 2024/0202059 A1 Jun. 20, 2024

Related U.S. Application Data

(63) Continuation of application No. 17/819,197, filed on Aug. 11, 2022, now Pat. No. 11,874,725.

(60) Provisional application No. 63/233,965, filed on Aug. 17, 2021.

(51) Int. Cl.
G06F 11/00 (2006.01)
G06F 11/07 (2006.01)

(52) U.S. Cl.
CPC ...... G06F 11/0769 (2013.01); G06F 11/0709 (2013.01); G06F 11/076 (2013.01)

(58) Field of Classification Search
CPC .. G06F 11/076; G06F 11/079; G06F 11/0754; G06F 11/321; G06F 11/327; G06F 11/323; G06F 18/22
See application file for complete search history.

(56) References Cited

U.S. PATENT DOCUMENTS

| | | | | |
|---|---|---|---|---|
| 11,874,725 B2 * | 1/2024 | Haile | ............... | G06F 11/0769 |
| 2015/0156076 A1 * | 6/2015 | Matejka | ............... | H04L 41/14 |
| | | | | 703/13 |
| 2015/0205693 A1 * | 7/2015 | Seto | ............... | G06F 11/3065 |
| | | | | 702/186 |

(Continued)

OTHER PUBLICATIONS

Wikipedia, Graphics Interchange Format, May 26, 2021 revision (Year: 2021).*

(Continued)

*Primary Examiner* — Marc Duncan

(57) ABSTRACT

Various embodiments comprise systems and methods to indicate when errors occur in a data pipeline. In some examples, data monitoring circuitry monitors the operations of a data pipeline. The data monitoring circuitry ingests an output data set generated by the pipeline, compares the output data set to an expected output, identifies differences between the output data set and the expected output, and determines when the magnitude of the difference exceeds an error threshold. When the error threshold is exceeded, the data monitoring circuitry generates a graphical representation of the output data set, a graphical representation of the expected pipeline output, and an animated transition from the graphical representation of the expected pipeline output to the graphical representation of the output data. The data pipeline monitoring circuitry transfers an alert that comprises the graphical representation of the expected pipeline output, the graphical representation of the output data, and the animated transition.

20 Claims, 7 Drawing Sheets

200

(56) References Cited

U.S. PATENT DOCUMENTS

2016/0034334 A1\*  2/2016  Sadovsky  ............... G06F 11/07
                                        714/57
2020/0201650 A1\*  6/2020  Huang  .................. G06F 9/3861
2021/0157702 A1\*  5/2021  Lemberg  ............. G06F 11/3452
2021/0406157 A1\*  12/2021  Bakshi  ................ G06F 11/3692

OTHER PUBLICATIONS

Wu, Eugene et al., Graphical Perception in Animated Data Visual-izations, 2013, ArXiv (Year: 2013).\*
Pu, Xiaoying et al., Datamations: Animated Explanations of Data Analysis Pipelines, 2021, ACM (Year: 2021).\*

\* cited by examiner

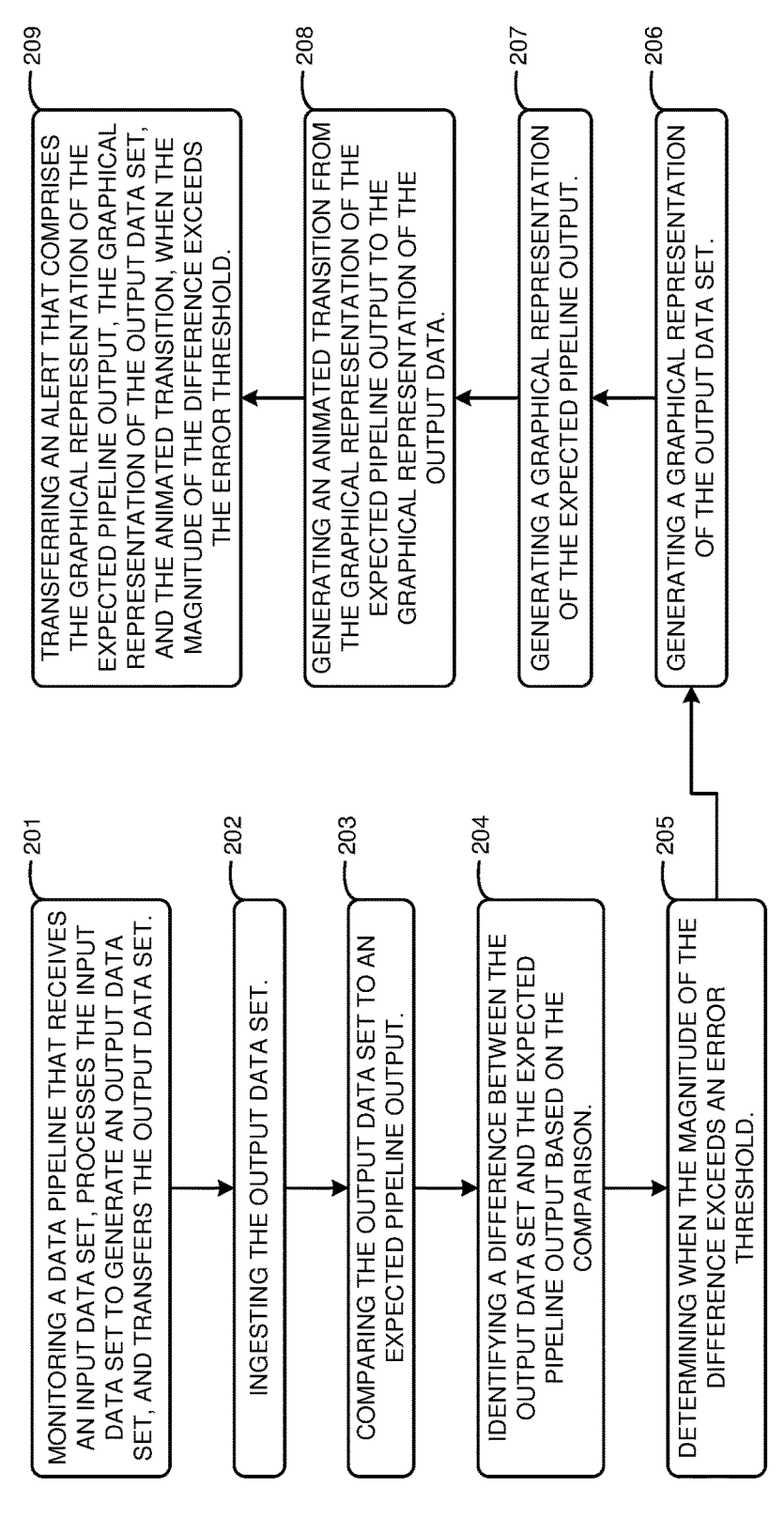

200

201 MONITORING A DATA PIPELINE THAT RECEIVES AN INPUT DATA SET, PROCESSES THE INPUT DATA SET TO GENERATE AN OUTPUT DATA SET, AND TRANSFERS THE OUTPUT DATA SET.

202 INGESTING THE OUTPUT DATA SET.

203 COMPARING THE OUTPUT DATA SET TO AN EXPECTED PIPELINE OUTPUT.

204 IDENTIFYING A DIFFERENCE BETWEEN THE OUTPUT DATA SET AND THE EXPECTED PIPELINE OUTPUT BASED ON THE COMPARISON.

205 DETERMINING WHEN THE MAGNITUDE OF THE DIFFERENCE EXCEEDS AN ERROR THRESHOLD.

206 GENERATING A GRAPHICAL REPRESENTATION OF THE OUTPUT DATA SET.

207 GENERATING A GRAPHICAL REPRESENTATION OF THE EXPECTED PIPELINE OUTPUT.

208 GENERATING AN ANIMATED TRANSITION FROM THE GRAPHICAL REPRESENTATION OF THE EXPECTED PIPELINE OUTPUT TO THE GRAPHICAL REPRESENTATION OF THE OUTPUT DATA.

209 TRANSFERRING AN ALERT THAT COMPRISES THE GRAPHICAL REPRESENTATION OF THE EXPECTED PIPELINE OUTPUT, THE GRAPHICAL REPRESENTATION OF THE OUTPUT DATA SET, AND THE ANIMATED TRANSITION, WHEN THE MAGNITUDE OF THE DIFFERENCE EXCEEDS THE ERROR THRESHOLD.

FIGURE 2

VISUAL ALERT GENERATION IN A DATA PIPELINE ENVIRONMENT

RELATED APPLICATIONS

This U.S. Patent Application claims priority to and the benefit of U.S. patent application Ser. No. 17/819,197 entitled "VISUAL ALERT GENERATION IN A DATA PIPELINE ENVIRONMENT" which was filed Aug. 11, 2022, which claims priority to and benefit of U.S. Provisional Patent Application 63/233,965 entitled "VISUAL ALERT GENERATION IN A DATA PIPELINE ENVIRONMENT" which was filed on Aug. 17, 2021, both of which are incorporated by reference into this U.S. Patent Application in their entirety.

TECHNICAL BACKGROUND

A data pipeline comprises a series of data processing elements that intake data from a data source, process the input data for a desired effect, and transfer the processed data to a data target. Data pipelines are configured to intake data that comprises a known format for their data processing elements to operate accurately. When the input data to a data pipeline is altered, the data processing elements may not recognize the changes which can cause malfunctions in the operation of the data pipeline. Changes to input data often arise when the data sets are large which results in variety of technical issues when processing or ingesting data received through a data pipeline. Implicit schema and schema creep like typos or changes to schema often cause issues when ingesting data. Completeness issues can also arise when ingesting data. For example, completeness can be compromised when there is an incorrect count of data rows/documents, there are missing fields or missing values, and/or there are duplicate and near-duplicate data entries. Additionally, accuracy issues may arise when there are incorrect types in fields. For example, a string field that often comprises numbers is altered to now comprise words. Accuracy issues may further arise when there are incorrect category field values and incorrect continuous field values. For example, a continuous field may usually have distribution between 0 and 100, but the distribution is significantly different on updated rows or out of usual bounds. Data pipelines may have bugs which impact data quality and data pipeline code is difficult to debug.

Data pipeline monitoring systems are employed to counteract the range of technical issues that occur with data pipelines. Traditional data pipeline monitoring systems employ a user defined ruleset that governs what inputs and outputs for a data pipeline should look like. For example, the manually defined rulesets may indicate schemas, types, value ranges, and data volumes the inputs and outputs of data pipelines should have. The data monitoring systems ingest the inputs and outputs of a data pipeline and apply the manually defined rulesets to the inputs and outputs to track when problems occur in the data pipelines. However, due to the number of problems that can occur in data pipelines, it is often difficult to notify pipeline operators about relevant issues affecting the data pipeline. Unfortunately, the data pipeline monitoring systems do not effectively and efficiently generate alerts to notify when problems occur in data pipelines.

OVERVIEW

This Overview is provided to introduce a selection of concepts in a simplified form that are further described below in the Detail Description. This summary is not intended to identify key features or essential features of the claimed subject matter, nor is it intended to be used as an aid in determining the scope of the claimed subject matter.

Various embodiments of the present technology generally relate to solutions for maintaining data integrity of a data pipeline. Some embodiments comprise a data pipeline monitoring system configured to indicate when errors occur in a data pipeline. In the data pipeline monitoring system, data monitoring circuitry monitors the operations of the data pipeline. The data pipeline receives an input data set, processes the input data set to generate an output data set, and transfers the output data set. The data monitoring circuitry ingests the output data set and compares the output data set to an expected pipeline output. The data monitoring circuitry identifies a difference between the output data set and the expected pipeline output based on the comparison and determines when the magnitude of the difference exceeds an error threshold. When the magnitude of the difference exceeds the error threshold, the data monitoring circuitry generates a graphical representation of the output data set, a graphical representation of the expected pipeline output, and an animated transition from the graphical representation of the expected pipeline output to the graphical representation of the output data. The data monitoring circuitry transfers an alert that comprises the graphical representation of the expected pipeline output, the graphical representation of the output data, and the animated transition.

Some embodiments comprise a method of operating a data pipeline monitoring system to indicate when errors occur in a data pipeline. The method includes monitoring the operations of the data pipeline where the data pipeline receives an input data set, processes the input data set to generate an output data set, and transfers the output data set. The method continues by ingesting the output data set, comparing the output data set to an expected pipeline output, identifying a difference between the output data set and the expected pipeline output based on the comparison, and determining when a magnitude of the difference exceeds an error threshold. The method continues generating a graphical representation of the output data set, a graphical representation of the expected pipeline output, and an animated transition from the graphical representation of the expected pipeline output to the graphical representation of the output data set when the magnitude of the difference exceeds the error threshold. The method continues by transferring an alert that comprises the graphical representation of the expected pipeline output, the graphical representation of the output data set, and the animated transition.

Some embodiments comprise a non-transitory computer-readable medium storing instructions to indicate when errors occur in a data pipeline. The instructions, in response to execution by one or more processors, cause the one or more processors to drive a system to perform pipeline monitoring operations. The operations comprise monitoring the operations of a data pipeline that receives an input data set, processes the input data set to generate an output data set, and transfers the output data set. The operations further comprise ingesting the output data set. The operations further comprise comparing the output data set to an expected pipeline output. The operations further comprise identifying a difference between the output data set and the expected pipeline output based on the comparison. The operations further comprise determining when a magnitude of the difference exceeds an error threshold. The operations further comprise generating a graphical representation of the output data set. The operations further comprise generating a graphical representation of the expected pipeline output. The operations further comprise generating an animated transition from the graphical representation of the expected pipeline output to the graphical representation of the output data set. The operations further comprise transferring an alert that comprises the graphical representation of the expected pipeline output, the graphical representation of the output data set, and the animated transition when the magnitude of the difference exceeds the error threshold.

DESCRIPTION OF THE DRAWINGS

Many aspects of the disclosure can be better understood with reference to the following drawings. The components in the drawings are not necessarily drawn to sale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation to indicate when errors occur in a data pipeline.

Figure 1:
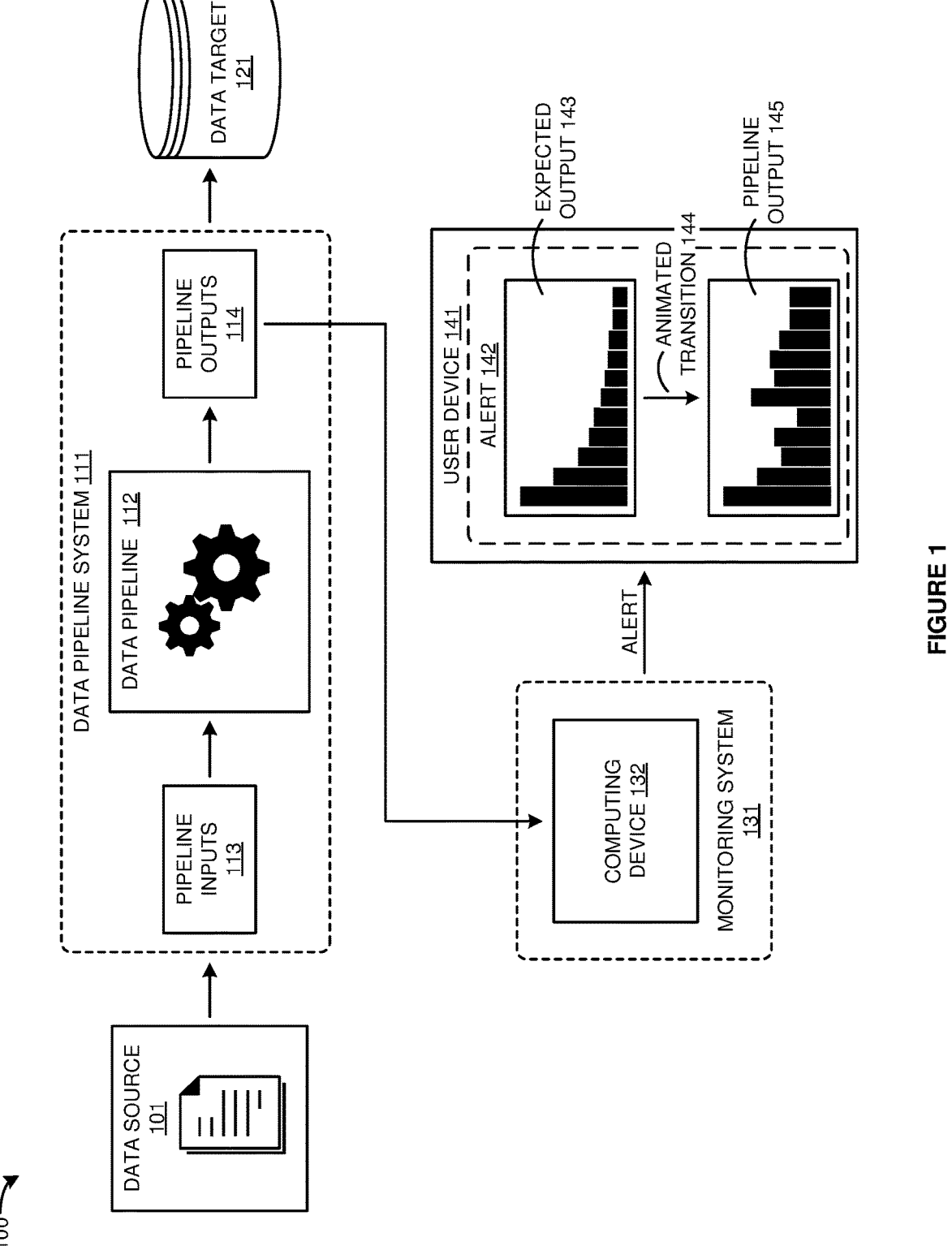
FIG. 1 illustrates an exemplary data processing environment to indicate when errors occur in a data pipeline.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology relate to solutions for monitoring the operations of data pipeline systems. More specifically, embodiments of the present technology relate to systems and methods for generating visual alerts to indicate when errors occur in a data pipeline. Now referring to the Figures.

FIG. 1 illustrates data processing environment 100 to monitor operations of a data pipeline. Data processing environment 100 processes raw data generated by data sources into a processed form for use in data analytics, data storage, data harvesting, and the like. Data processing environment 100 comprises data source 101, data pipeline system 111, data target 121, monitoring system 131, and user device 141. Data pipeline system 111 comprises data pipeline 112, pipeline inputs 113, and pipeline outputs 114. Monitoring system 131 comprises computing device 132. User device 141 comprises alert 142, expected output 143, animated transition 144, and pipeline output 145. In other examples, data processing environment 100 may include fewer or additional components than those illustrated in FIG. 1. Likewise, the illustrated components of data processing environment 100 may include fewer or additional components, assets, or connections than shown. Each of data source 101, data pipeline system 111, data target 121, monitoring system 131, and/or user device 141 may be representative of a single computing apparatus or multiple computing apparatuses.

Data source 101 is operatively coupled to data pipeline system 111. Data source 101 is representative one or more systems, apparatuses, computing devices, and the like that generate raw data for consumption by data pipeline system 111. Data source 101 may comprise a computing device of an industrial system, a financial system, research system, or some other type of system configured to generate data that characterizes that system. For example, data source 101 may comprise a computer affiliated with an online transaction service that generates sales data which characterizes events performed by the online transaction service. It should be appreciated that the type of data generated by data source 101 is not limited.

Data pipeline system 111 is operatively coupled to data pipeline source 101, data target 121, and monitoring system 131. Data pipeline system 111 is representative of a data processing system which intakes "raw" or otherwise unprocessed data from data source 101 and emits processed data configured for consumption by an end user. Data pipeline system 111 comprises data pipeline 112, pipeline inputs 113, and pipeline outputs 114. Pipeline inputs 113 comprise unprocessed data sets generated by data source 101. Pipeline outputs 114 comprise processed data sets generated by the one or more data processing operations implemented by data pipeline 112. Data pipeline 112 comprises one or more computing devices that are connected in series that intake pipeline inputs 113 received from data source 101, implement one or more processing steps on pipeline inputs 113, and generate pipeline outputs 114. For example, the computing devices of data pipeline 112 may ingest pipeline inputs 113 and execute transform functions on pipeline inputs 113. The execution of the transform functions alters pipeline inputs 113 into a consumable form to generate pipeline outputs 114. For example, pipeline inputs 113 may comprise data strings of non-uniform length and data pipeline 112 may parse the strings to form pipeline outputs 114. For example, pipeline inputs 113 may lack a data schema and data pipeline 112 may apply a schema to inputs 113 to generate pipeline outputs 114. Upon generation of pipeline outputs 114, data pipeline 112 transfers pipeline outputs to data target 121. In some examples, data pipeline system 112 may transfer pipeline outputs 114 to computing device 132 to facilitate the monitoring operations of monitoring system 131.

Data target 121 is operatively coupled to data pipeline system 111. Data target 121 is representative of one or more computing systems comprising memory that receive pipeline outputs 114 generated by data pipeline 112. Data target 121 may comprise a database, data structure, data repository, data lake, another data pipeline, and/or some other type of data storage system. In some examples, data target 121 may transfer pipeline outputs 114 received from data pipeline system 111 to monitoring system 131 to facilitate the pipeline monitoring operations of monitoring system 131.

Monitoring system 131 is operatively coupled to data pipeline system 111. Monitoring system 131 is representative of one or more computing devices configured to monitor the operation of data pipeline system 111. Monitoring system 131 is configured to ingest pipeline outputs 114 from data pipeline 112. In some examples, monitoring system 131 may possess a communication link with data target 121 and receive pipeline outputs 114 indirectly via data target 121. Monitoring system 131 comprises computing device 132. Computing device 132 comprises one or more computing apparatuses configured to host one or more applications configured to monitor the operation of data pipeline system 111 and generate alerts when errors are detected in data pipeline system 111. It should be appreciated that the specific number of applications and modules hosted by computing device 132 is not limited. Exemplary applications hosted by computing device 132 to monitor the operations of data pipeline system 111 include Data Culpa Validator and the like. Computing device 132 comprises transceiver circuitry configured to ingest an output data set (e.g., pipeline outputs 114). The data monitoring application(s) hosted by computing device 132 process the ingested output data set to identify various attributes of the data objects that comprise the set. The application may determine data value ranges, data types, schemas, data volumes, and the like. The application compares the attributes to an expected set of data attributes and identifies any differences between the output data set and an expected pipeline output. When the difference exceeds an error threshold, the application generates and transfers an alert 142 for delivery to user device 141. Monitoring system 131 may transfer the alert via text message, email, direct message over a networking application, and the like. For example, monitoring system 131 may transfer an email comprising a hyperlink to user device 141 that upon selection of the hyperlink, drives user device 141 to download and display alert 141.

User device 141 is representative of a computing device configured to receive and display alerts concerning the operations of data pipeline system 111. User device 141 may comprise a smart phone, tablet computing device, personal computer, smart watch, and the like. User device comprises user interface elements to present alert 142. The user interface elements may comprise a display, keyboard, touchscreen, monitor, and/or other elements configured to provide a visual representation of alert 142. User device 141 may provide a Guided User Interface (GUI) display that allows a user to interact with alert 142. For example, the user interface elements may receive keyboard inputs, touchscreen inputs, and the like to open and display alert 142 on the GUI. In some examples, data target 121 and user device 141 may be integrated into a single computing system that allows data operators to view alert 141. In some examples, data pipeline system 111 and user device 141 may be integrated into a single computing system that allows data pipeline operators to view alert 141.

Alert 142 comprises a notification that an error has been detected in the operations of data pipeline 112, pipeline inputs 113, and/or pipeline outputs 114. Alert 142 comprises expected output 143, animated transition 144, and pipeline output 145. Expected output 143 is representative of a graphic that depicts the data attributes pipeline outputs 114 should have. For example, expected output 143 may illustrate the data value ranges, data types, data schemas, data volumes, and/or other attributes pipeline outputs 114 should possess. Pipeline output 145 is representative of a graphic that depicts the erroneous data attributes pipeline outputs 114 actually have. For example, pipeline output 145 may illustrate the data value ranges, data types, data schemas, data volumes, and/or other attributes pipeline outputs 114 actually possess. Although expected output 143 and pipeline output 145 are depicted as bar graphs, their visual form is not limited. In some examples, expected output 143 and pipeline output 145 may comprise pie charts, tables, line plots, histograms, or other types of visual aids. Animated transition 144 is representative of an animation that illustrates the transition between expected output 143 and pipeline output 145. For example, animated transition 144 may comprise a Graphics Interchange Format (GIF) file, video, or another type of animation. In some examples, alert 142 may comprise contextual information that characterizes why the alert was generated. For example, the contextual information may indicate the mean of the data values is 15% higher than an expected pipeline output. The contextual information may additionally indicate an error cause. For example, the contextual information may indicate a malformation in pipeline inputs 113 caused the observed error.

Data pipeline system 111, data target 121, monitoring system 131, user device 141 comprise microprocessors, software, memories, transceivers, bus circuitry, and the like. The processors may comprise Central Processing Units (CPUs), Graphical Processing Units (GPUs), Application Specific Integrated Circuits (ASICs), Field Programmable Gate Arrays (FPGAs), and the like. The storage devices comprise flash circuitry, Random Access Memory (RAM), Hard Disk Drives (HDDs), Solid State Drives (SSDs), Non-Volatile Memory Express (NVMe SSDs), and the like. The memories store software like operating systems, user applications, data analysis applications, and data processing functions. The microprocessors retrieve the software from the memories and execute the software to drive the operation of the data processing system as described herein. The communication links that connect the elements of data processing system use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), Third Generation Partnership Project (3GPP) networking protocols like Fifth Generation New Radio (5GNR) and Long Term Evolution (LTE), virtual switching, inter-processor communication, bus interfaces, and/or some other data communication protocols. Data pipeline system 111, data target 121, monitoring system 131, and user device 141 may exist as a single computing device or may be distributed between multiple computing devices.

In some examples, data processing environment 100 implements process 200 illustrated in FIG. 2. It should be appreciated that the structure and operation of data processing environment 100 may differ in other examples.

FIG. 2 illustrates process 200. Process 200 comprises a process to notify when errors occur in a data pipeline. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 include monitoring the operations of a data pipeline that receives data inputs, processes the data inputs, and responsively generates and transfers a data output (step 201). The operations continue with ingesting the output data set (step 202). The operations continue with comparing the output data set to an expected pipeline output (step 203). The operations continue with identifying a difference between the output data set and the expected pipeline output based on the comparison (step 204). The operations continue with determining when the magnitude of the difference exceeds an error threshold (step 205). The operations continue with generating a graphical representation of the output data set (step 206). The operations continue with generating a graphical representation of the expected pipeline output (step 207). The operations continue with generating an animated transition from the graphical representation of the expected pipeline output to the graphical representation of the output data (step 208). The operations continue with transferring an alert that comprises the graphical representation of the expected pipeline output, the graphical representation of the output data set, and the animated transition when the magnitude of the difference exceeds the error threshold (step 209).

Referring back to FIG. 1, data processing environment 100 includes a brief example of process 200 as employed by one or more applications hosted by data pipeline system 111, data target 121, computing device 132, and user device 141. The operation may differ in other examples.

In operation, monitoring system 131 monitors the operation of the data pipeline (step 201). For example, computing device 132 may be operatively coupled to data pipeline 112. Data pipeline 112 receives pipeline inputs 113 from the data source 101. Data pipeline 112 executes a transform function on pipeline inputs 113 and responsively generates pipeline outputs 114. Pipeline outputs 114 comprises strings, integers, and/or another type of data. Data pipeline 112 transfers pipeline outputs to data target 121 and to computing device 132. For example, data pipeline 112 may copy an output stream comprising pipeline outputs 114 and transfer copied output stream for delivery to computing device 132.

Computing device 132 ingests output data set 135 generated by data pipeline 112 (step 202). The data monitoring applications hosted by computing device 132 process the output data set to determine a set of attributes to characterize the data objects that comprise the output data set. The monitoring application may determine the size of the data set, the data types and their proportions that comprise the data set, data value ranges, average data values, number of null fields, number of zero entries, data schema types, and the like. The monitoring application applies an implicitly defined data standard to output data set to compare the output data set to the data standard (step 203). The data standard defines a set of expected data attributes that the output data set should possess. For example, the data standard may comprise expected data volumes, expected data types, expected data type proportions, expected data value ranges, expected data value averages, expected number of null fields, expected number of zero entries, expected data schema types, and/or other types of expected data attributes for the output data set. The expected data attributes defined by the data standard may comprise historical data attributes possessed by previous output data sets generated by pipeline system 111.

The monitoring application identifies differences between the output data set received from pipeline system 111 and the data standard (step 204). The monitoring application may determine differences between the output data volumes and the expected data volumes, the output data types and expected the data types, the output data type proportions and expected data type proportions, the output data value ranges and the expected data value ranges, the output data value averages and the expected data value averages, the output data number of null fields and the expected number of null fields, the output data number of zero entries and the expected number of zero entries, the output data schema types and the expected data schema types, and/or other differences between the output set and the standard.

The monitoring application determines when the magnitude of the identified differences exceeds an error threshold (step 205). The error threshold defines an acceptable level of difference a given output set may exhibit when compared to the data standard. For example, the data standard may define a data value average where measured data values averages that differ more than 5% from data value average defined by the standard exceed the error threshold. The error threshold may be user configurable and differ for different data attributes. For example, the monitoring application may apply a strict error threshold for data types and a less strict error threshold for data volumes. When the magnitude of the differences exceeds the error threshold, the monitoring application proceeds to generate alert 142 to notify a human operator of user device 141.

The monitoring application generates a graphical representation of the output data set (step 206). For example, the monitoring application may generate a histogram the categorizes the data value ranges and their counts in the output data set. However, it should be appreciated that the type of graphical representation used to visually depict the output data set is not limited. Likewise, the monitoring application generates a graphical representation of an expected pipeline output (step 207). Typically, the type of graphical representation used to visually depict the expected pipeline output will be the same type of graphical representation used to depict the output data set. The monitoring application generates an animated transition from the graphical representation of the expected pipeline output to the graphical representation of the actual pipeline output to illustrate the differences between the two sets (step 208). For example, the expected pipeline output may comprise a historical data set generated by data pipeline system 111 and the animated transition may visually illustrate how the data output changed from the historical data set.

The monitoring application transfers alert 142 to user device 141. Alert 142 comprises the graphical representations for the expected output and the output data set and the animated transition between the graphical representations (step 209). Alert 142 may comprise additional information to contextualize the detected error. The monitoring application may drive transceiver circuitry in computing device 132 to transfer the alert via Short Message Service (SMS) message, email, direct message in a business networking application like Slack, or some other type of messaging technology. User device 141 receives and displays alert 142 for review by a user. For example, user device 141 may receive a text message comprising a hyperlink that, upon user selection, drives user device 141 to download and display alert 142 on its user interface systems.

Advantageously, data processing environment 100 effectively generates visual alerts when errors occur in the data pipeline. Moreover, the data processing environment 100 efficiently indicates the visual alert to user devices.

Figure 3:
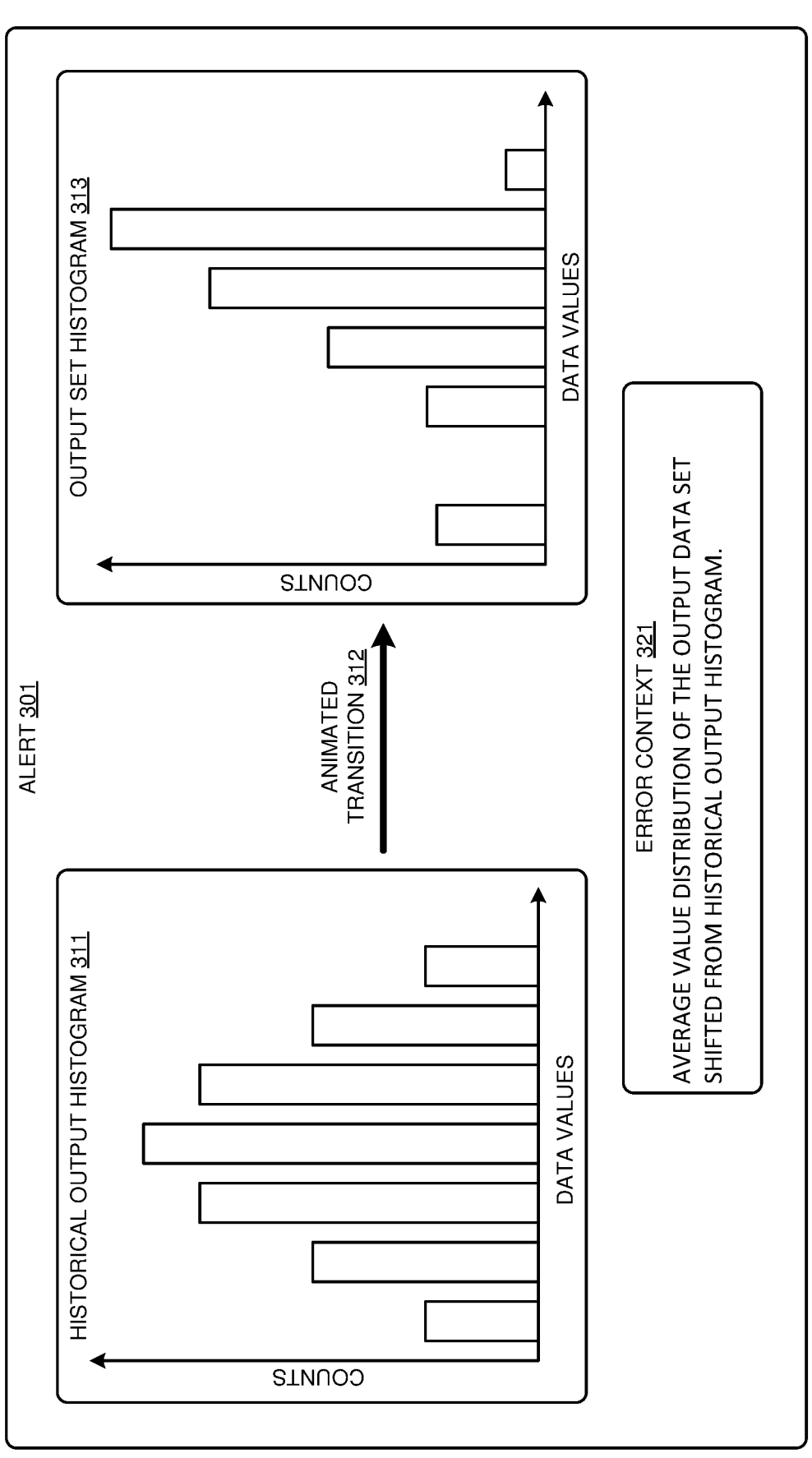
FIG. 3 illustrates an exemplary alert to indicate when errors occur in a data pipeline.

FIG. 3 illustrates alert 301 to notify when an error occurs in the operations of a data pipeline. Alert 301 is an example of alert 142 illustrated in FIG. 1, however alert 142 may differ. Alert 301 comprises historical output histogram 311, animated transition 312, output set histogram 313, and error context 321.

Historical output histogram 311 and output set histogram 313 comprises histograms that characterize the distribution of data values in the data sets. As illustrated in FIG. 3, the data values in the historical output data are normally distributed while the output data set comprises a different distribution than the historical output data and is missing a data field that is present in the historical output data. In other example, the change between the historical output data and the output data may differ than the present example. Animated transition 312 comprises a GIF file or some other type of animation type. Animated transition 312 illustrates a visual transition from historical output histogram 311 to output set histogram 313. Error context 321 comprises information that highlights the cause, type, data location, and/or other information to explain the source of the error. For example, error context 321 may comprise metadata that indicate the historical distribution and data fields, the change in the distribution, what fields are missing in the output data, the cause of the error, and a suggestion to remedy the error. In this example, error context 321 indicates the average value distribution of the output data set has shifted from the historical output data set.

In some examples, animated transition 321 may comprise a set of frames. Each frame depicts a set of output data and corresponds to a period of time over which the data pipeline generated output data. For example, each frame may correspond to a day of operation. A first one of the frames comprise historical output histogram 311, a second portion of the frames depict a transition period between historical output histogram 311 and output set histogram 313, and a final one of the frames comprises output set histogram 313. Typically, the portion of frames that comprise historical output histogram 311 depicts a steady state operation of the data pipeline. In some examples, animated transition 312 depicts changes in a data metric between a historical output data set and an output data set. For example, animated transition 312 may depict the change in the median from the historical output data to the output data. Animated transition 312 may comprise numerical values that change with the animated transition to highlight the affected data metric. In some examples, alert 301 comprises a Uniform Resource Locator (URL) that links to a web portal that hosts additional animated transitions. The additional animated transition may present a live or semi-live view on the web portal to illustrate further changes in the output data.

Figure 4:
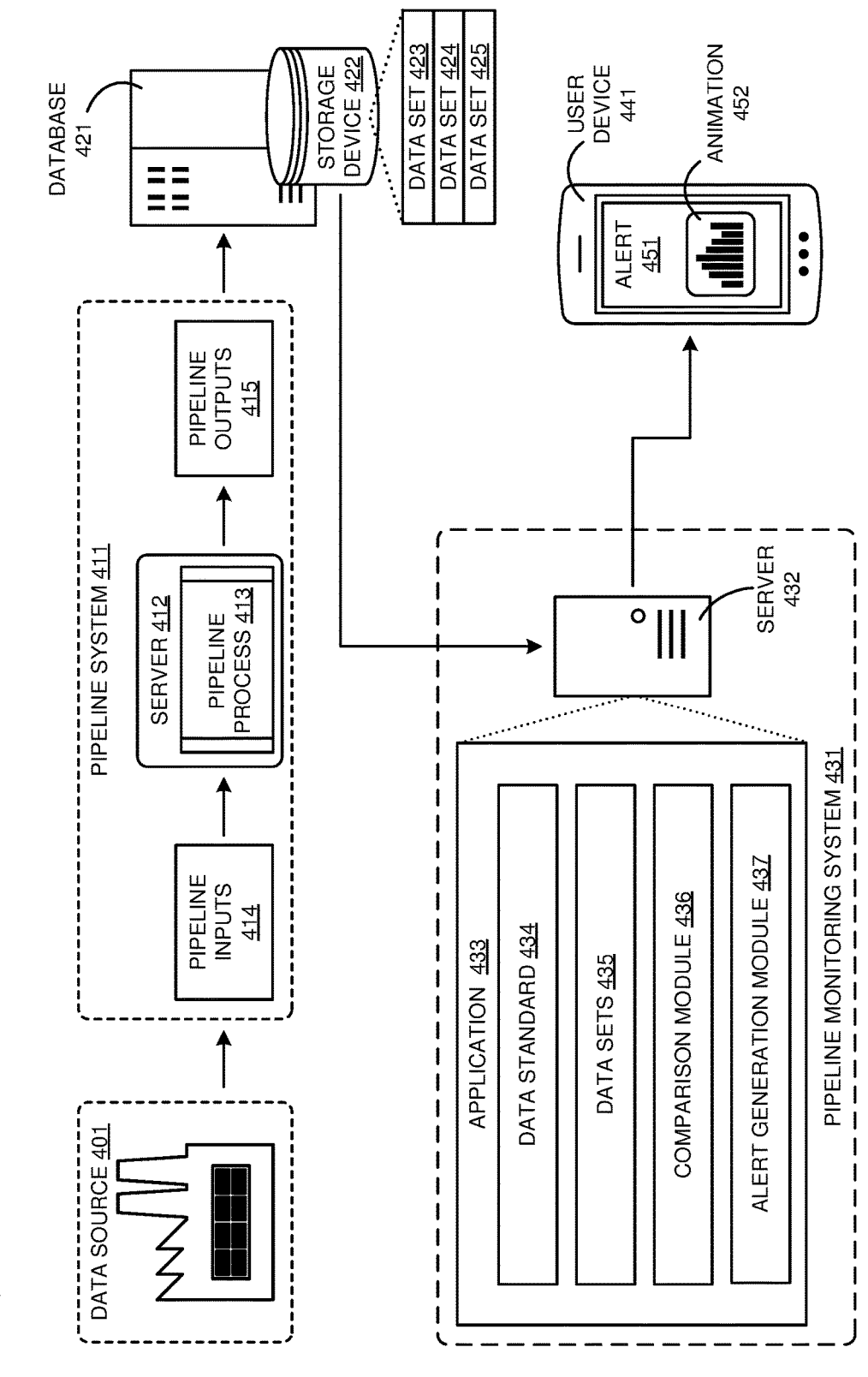
FIG. 4 illustrates an exemplary data processing environment to indicate when errors occur in a data pipeline.

FIG. 4 illustrates data processing environment 400 to notify when errors occur in a data pipeline. Data processing environment 400 is an example of data processing environment 100, however data processing environment 100 may differ. Data processing environment 400 comprises data source 401, pipeline system 411, database 421, pipeline monitoring system 431, and user device 441. Pipeline system 411 comprises server 412, pipeline process 413, pipeline inputs 414, and pipeline outputs 415. Database 421 comprises storage device 422 and data sets 423-425. Pipeline monitoring system 431 comprises server 432, and application 433.

Application 433 comprises data standard 434, data sets 435, comparison module 436, and alert generation module 437. User device 441 comprises alert 451 and animation 452. In other examples, data processing environment 400 may include fewer or additional components than those illustrated in FIG. 4. Likewise, the illustrated components of data processing environment 400 may include fewer or additional components, assets, or connections than shown. Each of data source 401, pipeline system 411, database 421, pipeline monitoring system 431, and/or user device 441 may be representative of a single computing apparatus or multiple computing apparatuses.

Data source 401 is representative of one or more computing devices configured to generate input data configured for ingestion by data pipeline system 411. In this example, data source 401 comprises a manufacturing environment that generates input data that characterizes manufacturing operations. For example, the input data may characterize production data like units produced per day. In other examples, data source 401 may produce a different type of data like financial data, scientific data, machine learning data, medical records, and/or other types of input data for consumption by data pipeline system 411. Typically, the input data generated by data source 401 comprise a form not-suitable for end user consumption (e.g., storage in database 421) and requires data processing by data pipeline system 411. It should be appreciated that the types of data sources that comprise data source 401 and the input data generated by data source 401 are not limited.

Pipeline system 411 is representative of a data processing system configured to receive and process input data from data source 401. Pipeline system 411 is an example of data pipeline system 111, however system 111 may differ. Pipeline system 411 comprises server 412, pipeline process 413, pipeline inputs 414, and pipeline outputs 415. Server computer 412 comprises processors, bus circuitry, storage devices, software, and the like configured to host pipeline process 413. The processors may comprise CPUs, GPUs, ASICs, FPGAs, and the like. The storage devices comprise flash circuitry, RAM, HDDs, SSDs, NVMe SSDs, and the like. The storage devices store the software. The processors may retrieve and execute software stored on the storage devices to drive the operation of pipeline process 413. Pipeline process 413 comprises a series of processing algorithms configured to transform pipeline inputs 414 into pipeline outputs 415. The data processing algorithms may comprise one or more transform functions configured to operate on pipeline inputs 414. The transform functions may be executed by the processors of server 412 on pipeline inputs 414 and responsively generate pipeline outputs 415. Pipeline inputs 414 comprise data generated by data source 401. Pipeline outputs 415 comprise data emitted by pipeline process 413. For example, pipeline process 413 may comprise a data cleaning process that transforms pipeline inputs 414 into pipeline outputs 415 suitable for storage in database 421. The cleaning process may comprise reformatting, redundancy removal, or some other type of operation to standardize pipeline inputs 414. It should be appreciated that pipeline process 413 is exemplary and the specific data processing operations implemented by pipeline process 413 are not limited.

In some examples, pipeline process 413 may comprise a machine learning model where pipeline inputs 414 represent machine learning inputs and pipeline outputs 415 represent machine learning outputs. The machine learning model may comprise one or more machine learning algorithms trained to implement a desired process. Some examples of machine learning algorithms include artificial neural networks, nearest neighbor methods, ensemble random forests, support vector machines, naïve Bayes methods, linear regressions, or other types of machine learning algorithms that predict output data based on input data. For example, pipeline inputs 414 may comprise feature vectors configured for ingestion by the one or more machine learning algorithms and pipeline outputs 415 may comprise machine learning decisions.

Database 421 comprises storage device 422 and is representative of a data target for pipeline process 413. Database 421 is an example of data target 121, however data target 121 may differ. Database 421 comprises processors, bus circuitry, storage devices (including storage device 422), software, and the like configured to store output data sets 423-425. The processors may comprise CPUs, GPUs, ASICs, and the like. The storage devices comprise flash drives, RAM, HDDs, SSDs, NVMe SSDs, and the like. The processors may retrieve and execute software stored upon the storage devices to drive the operation of database 421. Storage device 422 is configured to receive and store pipeline outputs 415 generated from pipeline process 413 as data sets 423-425. For example, storage device 422 may comprise an array of disk drives configured to store large amounts of data produced by pipeline system 411. Storage device 422 may implement a data structure that categorizes and organizes pipeline outputs 415 according to a data storage scheme. For example, output data sets 423-425 may be organized by data type, size, point of origin, and/or any other suitable data storage scheme. Database 421 may comprise user interface systems like displays, keyboards, touchscreens, and the like. The user interface systems may allow a human operator to review, select, and transfer ones of data sets 423-425 to pipeline monitoring system 431. Storage device 422 may transfer data sets 423-425 to determine data quality for sets 423-425 in response to user input received via the user interface devices of database 421.

Pipeline monitoring system 431 is representative of one or more computing devices integrated into a network configured to monitor the operation of data pipeline system 411. Pipeline monitoring system 431 is an example of monitoring system 131, however monitoring system 131 may differ. Pipeline monitoring system 431 comprises server computer 432. Server computer 432 comprises one or more computing devices configured to host application 433. Server 432 is communicatively coupled to database 421 to receive data sets 423-425 and coupled to user device 441 to transfer alerts when errors are detected in the operations of pipeline system 411. The one or more computing devices that comprise server 432 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of application 433. Server 432 may include user interface systems like displays, mobile devices, touchscreen devices, or some other type of computing device capable of performing the user interface functions described herein. A user may interact with application 433 via the user interface systems to generate, view, and interact with data standard 434, data sets 435, comparison module 436, and alert generation module 437.

Application 433 is representative of one or more pipeline monitoring applications user interface applications, operating systems, modules, and the like. Application 433 is configured to receive data sets 423-425 generated by data pipeline system 411, apply data standards to the set to detect errors in the data pipeline, and generate alerts to indicate the errors. Application 433 may comprise a GUI like a dashboard that visually depicts application 433 and to facilitate user interaction with application 433. Application includes data standard 434, data sets 435, comparison module 436, and alert generation module 437. In other examples, the graphical representation may include additional or different types of visual indicators relevant to the operation and status of data pipeline system 411. Data standard 434 comprises an implicitly defined data standard that defines a preferred format for pipeline outputs 415. The preferred data formats may comprise metadata, data schemas, data value ranges, data types, and the like. For example, data standard 434 may indicate the preferred data value range as 0 to 100.

Data sets 435 comprise a data set ingested by server 432. For example, database 421 may transfer data sets 423-425 to server 432 and server 432 may ingest the received data as data sets 435. Data sets 435 comprise both historical data sets and current data sets generated pipeline system 411. Comparison module 436 comprises a module configured to apply data standards to data sets ingested by application 433. For example, comparison module 436 may apply data standard 434 to data set 423 to determine if one or more attributes of data set 423 violate an error threshold. Typically, when data outputs 415 exhibit behavior the violates the error thresholds, a problem has occurred in the operations of pipeline process 413 and/or pipeline inputs 414. For example, a faulty software update to pipeline process 413 may cause data outputs 415 to become malformed.

Alert generation module 437 comprises a module to generate visual alerts to notify human operators when errors occur in data pipeline system 411. For example, comparison module 436 may determine an output generated by pipeline system 411 exceeds an error threshold and alert generation module 437 may responsively generate and transfer alert 451 to user device 441. The alerts generated by module 437 comprise animated visualizations to illustrate how the output data sets generated by pipeline system 411 change over time. The animated visualizations illustrate how the error in pipeline system 411 affects one or more attributes of the data sets. For example, the animated visualizations may illustrate how the proportion of data types that comprise strings in the output data sets change over time. The time period depicted by the animated visualizations is not limited. For example, the animated visualization may depict how the output data sets change over a period of 14 days. The alerts may additionally comprise contextual information that indicates what attributes of the data sets became erroneous and the cause of the error in the data pipeline.

User device 441 is representative of a user computer configured to receive alerts generated in pipeline monitoring system 431. In this example, user device 441 is depicted as a smartphone, however in other example, the type of user device that comprises user device 441 may differ. For example, user device 441 may comprise a tablet computer in other examples. User device 441 displays alert 451 which comprises animation 452 to notify a user that an error has occur in pipeline system 411. User device 441 may receive alert 451 over wireless communication channels as a text message, email, direct message, or some other type of messaging protocol. For example, user device may receive a text message comprising a link, that upon selection by a user, drivers user device 441 to display alert 451. User device 441 comprises processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of user device 441.

Figure 5:
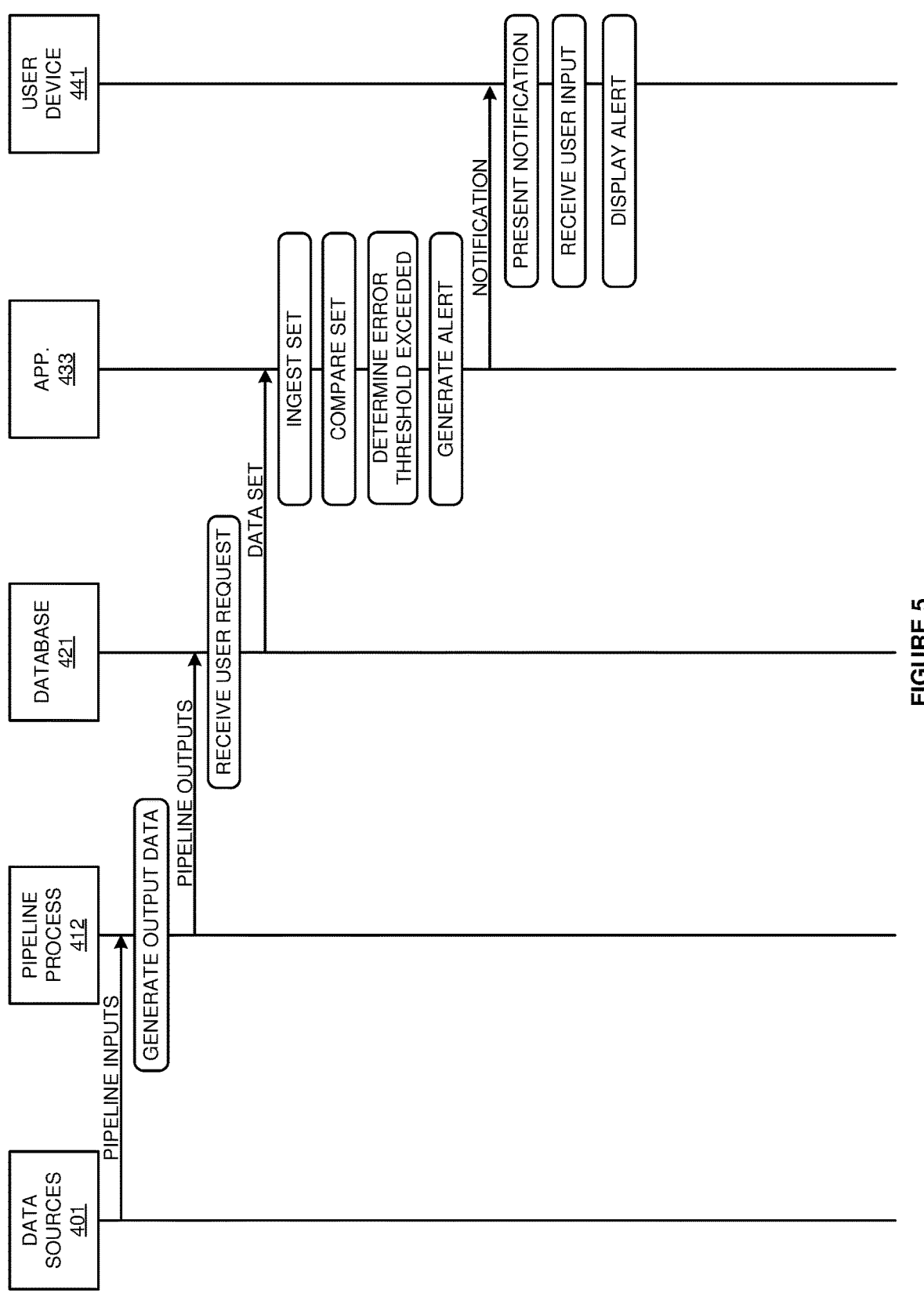
FIG. 5 illustrates an exemplary operation to indicate when errors occur in a data pipeline.

FIG. 5 illustrates an exemplary operation of data processing environment 400 to notify when errors occur in a data pipeline. The operation depicted by FIG. 5 comprises an example of process 200 illustrated in FIG. 2 however process 200 may differ. In other examples, the structure and operation of data processing environment 400 may be different.

In operation, data source 401 transfers unprocessed manufacturing data to data pipeline system 411. For example, data source 401 may generate machine operation data like average temperature in the manufacturing environment and transfer the machine operation data to data pipeline system 411. Data pipeline system 411 receives the unprocessed data as pipeline inputs 414. Server 412 ingests pipeline inputs 414 and executes pipeline process 413 on pipeline inputs 414. Pipeline process 413 cleans, transforms, applies a schema, or otherwise processes pipeline inputs 414 into a consumable form to generate pipeline outputs 415. Server 412 transfers pipeline outputs 415 to database 421. Database 421 receives pipeline outputs 415 as output data and stores the output data in storage device 422 as data sets 423-425. Database 421 receives a user request to analyze one of sets 423-435. In response to the user request, database 421 calls application 433 hosted by server computer 432 to ingest data sets 423-425 generated by data pipeline system 411 for analysis. For example, application 433 may possess an Application Programming Interface (API) to receive data ingestion requests.

Application 433 accepts the call from database 421 and server 432 ingests the received data as data sets 435. Application 433 executes comparison module 436 to score data sets 435 against data standard 434 to detect errors in data pipeline system 411. Comparison module 436 applies data standard 434 to data sets 435 and identifies differences between sets 435 and standard 434. Data standard 434 comprises one or more thresholds that define acceptable data attribute ranges for sets 435. For example, the standard may define an acceptable amount of null data fields in sets 435. When one or more of data sets 435 exceed the error threshold(s), application 433 executes alert generation module 437 to generate alert 451. Alert generation module 437 generates constructs animation 452 to illustrate how data sets 435 change over time to illustrate when the error occurred in the operations of data pipeline system 411. Application 433 drives transceiver circuitry in server 432 to transfer alert 451 to user device 441. Server 432 transfers alert 451 for wireless delivery to user device 441.

User device 441 presents a notification that alert 451 was received from data pipeline monitoring system 431. User device 441 receives a user input in response to the notification that drives user device 441 to present alert 451. User device 441 displays alert 451 including animation 452. Animation 452 plays and illustrates how data sets 435 change over time to highlight the error in data pipeline system 411.

In some examples, application 433 may compare an output data set to a historical data set to detect errors in the data pipeline. For example, application 433 may determine the output data set was generated over a first period of time. The period of time may comprise a day of the week, a week of operation of pipeline system 411, or some other time period. For example, application 433 may determine the data set was generated by pipeline system 411 on a Thursday. Application 433 selects a historical data set that was generated over a period of time that corresponds to the period of time the output data set was generated. For example, application 433 may select a historical data set that was generated by pipeline system 411 on the same day of the week as the output data set. Application 433 compares the output data set and with the selected historical data set to determine differences between the two sets that trigger an error threshold and alert generation.

Figure 6:
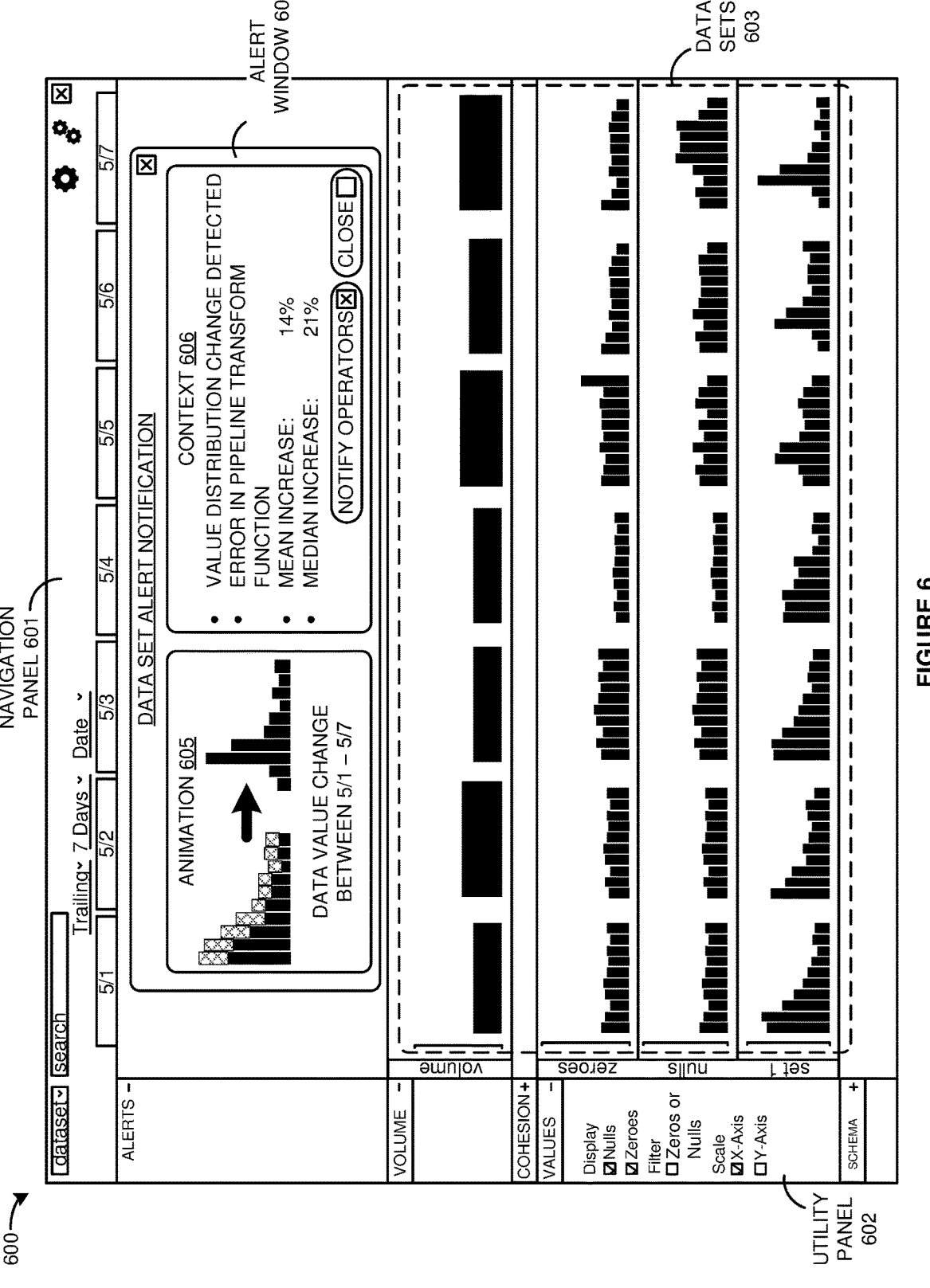
FIG. 6 illustrates an exemplary user interface to indicate when errors occur in a data pipeline.

FIG. 6 illustrates user interface 600 to alert when errors occur in the operations of a data pipeline. User interface 600 comprises an example of user interface systems described with respect to monitoring system 431 and user device 441 described in FIG. 4, however the user interface systems described in FIG. 3 may differ. User interface 600 comprises a pipeline monitoring application presented on a display screen which is representative of any user interface for indicating when errors occur in a data pipeline. User interface 600 comprises a GUI configured to allow a user to view operational metrics for a data pipeline like data volume and data shape and to receive notifications regarding detected errors in the operations of the data pipeline. The GUI provides visualizations for how data set volume, data set values, data set zero values, and data set null values change over time. In other examples, the GUI of user interface 600 may differ.

User interface 600 includes navigation panel 601. Navigation panel 601 comprises tabs like "dataset" and "search" that allows a user to find and import data sets into user interface 600. For example, a user may interact with the "dataset" tab to import a data set from a data storage system that receives the outputs of the pipeline. Navigation panel 601 also includes date range options to select data sets a data set from a period of time. In this example, a user has selected to view a data set over a week ranging from May $1^{st}$ to May $7^{th}$ labeled as 5/1-5/7 in user interface 600. In other examples, a user may select a different date range and/or a different number of days.

User interface 600 includes utility panel 602. Utility panel 602 comprises tabs labeled "ALERTS", "VOLUME", "COHESION", "VALUES", and "SCHEMA". In other examples, utility panel 602 may comprise different tabs than illustrated in FIG. 6. When a user selects one of the tabs, the tab expands to reveal its contents. In this example, a user has opened the "VALUES" tab, the "VOLUME" tab, and the "ALERTS" tab. The "VALUES" tab and the "VOLUME" tab comprises data sets 603. The "VALUES" tab also includes display options to modify the view of data sets 603. The display options include toggles labeled "Nulls", "Zeroes", "Zeroes or Nulls", "X-Axis", and "Y-Axis". In other examples, the display options may differ. The "ALERTS" tab comprises alert window 605.

User interface 600 includes data sets 603. Data sets 603 comprises histogram visualizations, bar graph visualizations, and/or other types of visualizations of data sets imported into user interface 600. In this example, data sets 603 include "volume", "zeroes", "nulls", and "set 1". Each set of data sets 603 corresponds to the date selected by a user in navigation panel 601. For example, the "zeroes" data set of data sets 603 is presented as a row with each portion of the set corresponding to the dates presented in navigation panel 601. Data sets 603 allow a user to view the shape and/or other attributes of the imported data sets. The "zeroes" sets of data sets 603 comprise histograms that characterize the number of zero values for the data fields that comprise outputs of a data pipeline. The "nulls" sets of data sets 603 comprise histograms that characterize the number of null fields for the data sets that comprise outputs of a data pipeline. The "volume" sets of data sets 603 indicates the data volume output by the data pipeline. The "set 1" sets of data sets 603 comprise histograms that characterize the value distributions for the data fields that comprise outputs of a data pipeline. In other examples, data sets 603 may comprise different types of data sets than those illustrated in FIG. 6.

User interface 600 includes alert window 604. Alert window 604 is representative an alert to notify a user that an error occurred in a data pipeline. Alert window 604 is an example of alert 142, alert 301, and alert 451, however alerts 142, 301, and 451 may differ. Alert window 604 comprises animation 605 and context 606. In should be appreciated that alert window 604 is exemplary and may differ in other examples. Animation 605 comprises an animated visualization that depicts how set 1 changes over the selected date range from May 1 to May 7. The histogram comprising the starting frame of animation 605 comprises highlights. The highlights indicate acceptable data value ranges from data sets of set 1. Context 606 comprises textual information to characterize the detected error in the data pipeline. In this example, context 606 indicates the value distribution in the selected set has changed and that the change was caused by an error in the pipeline transform function. Context 606 additionally indicates the data mean increased by 14% and the data median value increased by 21%. Alert window 604 comprises user selectable options to respond to the detected error. In this example, the selectable options comprise an option to notify operators or to close the alert. In this example, a user has selected the option to notify operators. It should be appreciated that the information and user selectable options depicted in context 606 is exemplary and may differ in other examples.

Figure 7:
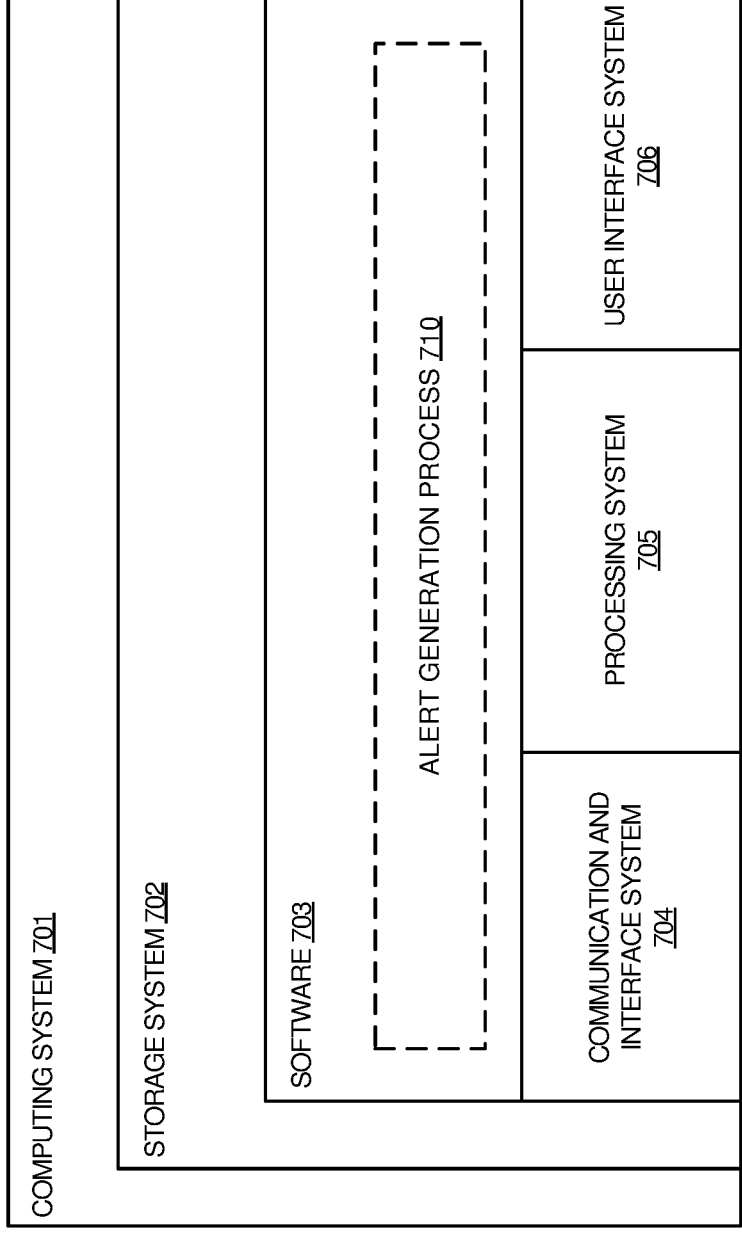
FIG. 7 illustrates an exemplary computing device that may be used in accordance with some embodiments of the present technology.

FIG. 7 illustrates computing device 701 which is representative of any system or collection of systems in which the various processes, programs, services, and scenarios disclosed herein for to alert when errors occur in data pipelines within data processing environments may be implemented. For example, computing device 701 may be representative of data pipeline system 111, data target 121, computing device 132, user device 141, pipeline system 411, database 421, server 432, user device 441, and/or user interface 600. Examples of computing system 701 include, but are not limited to, server computers, routers, web servers, cloud computing platforms, and data center equipment, as well as any other type of physical or virtual server machine, physical or virtual router, container, and any variation or combination thereof.

Computing system 701 may be implemented as a single apparatus, system, or device or may be implemented in a distributed manner as multiple apparatuses, systems, or devices. Computing system 701 includes, but is not limited to, storage system 702, software 703, communication and interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements alert generation process 710, which is representative of the processes to detect errors in data pipelines and generate visual alerts to notify operators when errors occur described in the preceding Figures. For example, alert generation process 710 may be representative of process 200 illustrated in FIG. 2 and/or the exemplary operation of environment 400 illustrated in FIG. 5. When executed by processing system 705, software 703 directs processing system 705 to operate as described herein for at least the various processes, operational scenarios, and sequences discussed in the foregoing implementations. Computing system 701 may optionally include additional devices, features, or functionality not discussed here for purposes of brevity.

Processing system 705 may comprise a micro-processor and other circuitry that retrieves and executes software 703 from storage system 702. Processing system 705 may be implemented within a single processing device but may also be distributed across multiple processing devices or subsystems that cooperate in executing program instructions. Examples of processing system 705 include general purpose central processing units, graphical processing units, application specific processors, and logic devices, as well as any other type of processing device, combinations, or variations thereof.

Storage system 702 may comprise any computer readable storage media that is readable by processing system 705 and capable of storing software 703. Storage system 702 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (alert generation process 710) may be implemented in program instructions and among other functions may, when executed by processing system 705, direct processing system 705 to operate as described with respect to the various operational scenarios, sequences, and processes illustrated herein. For example, software 703 may include program instructions for detecting errors in a data pipeline, generating an animated alert that illustrates how pipeline outputs changed as a result of the detected error, and transferring the alert as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to generate and transfer visual alerts as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices detect errors in a data pipeline and generate alerts to notify operators of the errors, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A data pipeline monitoring system configured to detect errors in a data pipeline, the data pipeline monitoring system comprising:

processing circuitry configured to:

monitor operations of the data pipeline;

determine when a magnitude of a difference between a pipeline output and an expected pipeline output triggers an error threshold, wherein the expected pipeline output corresponds to a first period of time, the pipeline output corresponds to a second period of time, and the expected pipeline output is selected based on a correspondence between the first period of time and the second period of time; and when the magnitude of the difference triggers the error threshold, generate graphical representations of the pipeline output and the expected pipeline output and an animated transition between the graphical representations.

2. The system of claim 1 wherein the processing circuitry is configured to transfer an alert that comprises the graphical representations and the animated transition.

3. The system of claim 2 wherein the alert comprises at least one of an email or a text message.

4. The system of claim 2 wherein:

the processing circuitry is configured to determine a cause for the difference between the pipeline output and the expected pipeline output; and the alert comprises contextual information that indicates the cause of the difference.

5. The system of claim 2 wherein the alert comprises a Graphics Interchange Format (GIF) file.

6. The system of claim 1 wherein:

the processing circuitry is configured to determine when the magnitude of the difference between at least one of data values, data types, or data schema of the pipeline output and expected data values, expected data types, or expected data schema of the expected pipeline output triggers the error threshold.

7. The system of claim 1 wherein the expected pipeline output comprises a historical pipeline output.

8. The system of claim 1 wherein the correspondence between the first period of time and the second period of time comprises a day of the week.

9. A method of operating a data pipeline monitoring system to detect errors in a data pipeline, the method comprising:

monitoring operations of the data pipeline;

determining when a magnitude of a difference between a pipeline output and an expected pipeline output triggers an error threshold, wherein the expected pipeline output corresponds to a first period of time, the pipeline output corresponds to a second period of time, and the expected pipeline output is selected based on a correspondence between the first period of time and the second period of time; and when the magnitude of the difference triggers the error threshold, generating graphical representations of the pipeline output and the expected pipeline output and an animated transition between the graphical representations.

10. The method of claim 9 further comprising transferring an alert that comprises the graphical representations and the animated transition.

11. The method of claim 10 wherein the alert comprises at least one of an email or a text message.

12. The method of claim 10 further comprising:

determining a cause for the difference between the pipeline output and the expected pipeline output; and wherein:

the alert comprises contextual information that indicates the cause of the difference.

13. The method of claim 10 wherein the alert comprises a Graphics Interchange Format (GIF) file.

14. The method of claim 9 wherein:

determining when the magnitude of the difference between the pipeline output and the expected pipeline output triggers the error threshold comprises determining when the magnitude of the difference between at least one of data values, data types, or data schema of the pipeline output and expected data values, expected data types, or expected data schema of the expected pipeline output triggers the error threshold.

15. The method of claim 9 wherein the expected pipeline output comprises a historical pipeline output.

16. A non-transitory computer-readable medium storing instructions to detect errors in a data pipeline, wherein the instructions, in response to execution by one or more processors, cause the one or more processors to drive a system to perform operations comprising:

monitoring operations of the data pipeline;

determining when a magnitude of a difference between a pipeline output and an expected pipeline output triggers an error threshold, wherein the expected pipeline output corresponds to a first period of time, the pipeline output corresponds to a second period of time, and the expected pipeline output is selected based on a correspondence between the first period of time and the second period of time;

when the magnitude of the difference triggers the error threshold, generating graphical representations of the pipeline output and the expected pipeline output and an animated transition between the graphical representations.

17. The non-transitory computer-readable medium of claim 16, wherein the operations further comprise transferring at least one of an email or a text message that comprises the graphical representations and the animated transition.

18. The non-transitory computer-readable medium of claim 17, the operations further comprising:

determining a cause for the difference between the pipeline output and the expected pipeline output; and wherein:

the at least one of the text message or email comprises contextual information that indicates the cause of the difference.

19. The non-transitory computer-readable medium of claim 16 wherein:

determining when the magnitude of the difference between the pipeline output and the expected pipeline output triggers the error threshold comprises determining when the magnitude of the difference between at least one of data values, data types, or data schema of the pipeline output and expected data values, expected data types, or expected data schema of the expected pipeline output triggers the error threshold.

20. The non-transitory computer-readable medium of claim 16 wherein the expected pipeline output comprises a historical pipeline output.

*   *   *   *   *